US008774999B2

(12) United States Patent
Takeda et al.

(10) Patent No.: US 8,774,999 B2
(45) Date of Patent: Jul. 8, 2014

(54) AIR-CONDITIONING CONTROL DEVICE FOR ELECTRIC VEHICLE

(75) Inventors: Hideto Takeda, Kariya (JP); Hironori Asa, Okazaki (JP); Keiichi Uno, Kariya (JP); Tomoki Fujino, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/463,840

(22) Filed: May 4, 2012

(65) Prior Publication Data

US 2012/0290161 A1    Nov. 15, 2012

(30) Foreign Application Priority Data

May 12, 2011 (JP) ................................. 2011-107015

(51) Int. Cl.
*B60W 20/00* (2006.01)
*B60W 10/08* (2006.01)
*B60W 10/30* (2006.01)
*B60W 10/06* (2006.01)

(52) U.S. Cl.
USPC .................. 701/22; 701/36; 700/276; 62/467

(58) Field of Classification Search
USPC ........................... 701/22, 36; 700/276; 62/467
See application file for complete search history.

(56) References Cited

U.S. PATENT DOCUMENTS

| | | | |
|---|---|---|---|
| 5,786,640 A * | 7/1998 | Sakai et al. ...................... 290/17 |
| 5,969,624 A * | 10/1999 | Sakai et al. ................ 340/636.1 |
| 6,675,597 B2 * | 1/2004 | Ieda et al. ........................ 62/244 |
| 6,889,125 B2 * | 5/2005 | Nakao et al. ..................... 701/22 |
| 6,986,645 B2 * | 1/2006 | Iwanami et al. ................ 417/16 |
| 7,096,935 B2 * | 8/2006 | Ieda et al. ....................... 165/202 |
| 7,715,957 B2 * | 5/2010 | Yamaguchi et al. ............ 701/22 |
| 7,849,944 B2 * | 12/2010 | DeVault ..................... 180/65.29 |
| 8,151,915 B2 * | 4/2012 | Kikuchi et al. ............ 180/65.21 |
| 8,256,547 B2 * | 9/2012 | Ichikawa .................... 180/65.29 |
| 8,467,924 B2 * | 6/2013 | Shiba ............................. 701/22 |
| 8,620,527 B2 * | 12/2013 | Stone et al. ..................... 701/41 |
| 2008/0011005 A1 * | 1/2008 | Obayashi et al. ............... 62/243 |
| 2010/0050671 A1 * | 3/2010 | Kahn et al. ...................... 62/190 |
| 2010/0076663 A1 * | 3/2010 | Jinno et al. ..................... 701/102 |
| 2010/0089563 A1 * | 4/2010 | Sundhar et al. ............... 165/202 |
| 2010/0168943 A1 * | 7/2010 | Fukushiro et al. .............. 701/22 |
| 2010/0262322 A1 * | 10/2010 | Yokouchi et al. ............... 701/22 |
| 2011/0239659 A1 * | 10/2011 | Lior ................................ 60/783 |
| 2011/0257973 A1 * | 10/2011 | Chutorash et al. ............ 704/235 |
| 2012/0072064 A1 * | 3/2012 | Kumazaki et al. .............. 701/22 |

(Continued)

FOREIGN PATENT DOCUMENTS

CN     101737194 A  *  6/2010
CN     101987624 A  *  3/2011

(Continued)

*Primary Examiner* — Tuan C. To
(74) *Attorney, Agent, or Firm* — Nixon & Vanderhye PC (57) ABSTRACT

A detector detects a remaining power of a battery. A calculator calculates a demand load of air-conditioning based on at least one of a preset temperature set for air in a passenger compartment of an electric vehicle and an outside temperature of air outside of the electric vehicle. A switching portion switches a mode of air-conditioning between a battery mode and an engine mode based on the calculated demand load and the detected remaining power of the battery. The battery mode causes the battery to supply electric power for air-conditioning, and the engine mode causes an engine of the electric vehicle to supply combustion energy for air-conditioning.

12 Claims, 3 Drawing Sheets

(56) References Cited

U.S. PATENT DOCUMENTS

2012/0159986 A1* 6/2012 Imanishi et al. ............... 62/498
2012/0209465 A1* 8/2012 Dehmann ..................... 701/22
2012/0304674 A1* 12/2012 Schwarzkopf ................ 62/79

FOREIGN PATENT DOCUMENTS

| JP | 2010-12970 | 1/2010 |
| JP | 2012-200131 | 10/2012 |
| WO | WO 0011691 A1 * | 3/2000 |

* cited by examiner

AIR-CONDITIONING CONTROL DEVICE FOR ELECTRIC VEHICLE

CROSS REFERENCE TO RELATED APPLICATION

This application is based on Japanese Patent Application No. 2011-107015 filed on May 12, 2011, the disclosure of which is incorporated herein by reference in its entirety.

TECHNICAL FIELD

The present disclosure relates to an air-conditioning control device for an electric vehicle.

BACKGROUND

An electric vehicle is required to have long drive distance per charging. For example, a battery of a plug-in type electric vehicle is charged by commercial power utility (100V) before a drive. The electric vehicle is required to have longer drive distance without additional charging when the drive is started with the fully charged state.

JP-A-2010-12970 describes an electric vehicle having an engine air-conditioning mode and a battery air-conditioning mode. In the engine air-conditioning mode, air-conditioning is performed using output of a relatively small engine. In the battery air-conditioning mode, air-conditioning is performed using electric power of a battery.

In the engine air-conditioning mode, a cooling operation is conducted by driving a refrigerant compressor of a refrigerating cycle using a rotation torque of an output shaft of the engine, and a heating operation is conducted using exhaust heat of the engine. In the battery air-conditioning mode, a cooling operation is conducted by driving the refrigerant compressor with the electric power of the battery, and a heating operation is conducted using an electric heater.

The electric vehicle is required to use the electric power charged in the battery prior to using fuel for the engine. In JP-A-2010-12970, the engine is activated when a remaining power of the battery becomes equal to or lower than a predetermined value. At this time, the battery air-conditioning mode is switched to the engine air-conditioning mode. The drive distance per charging is increased in such manner.

The timing for activating the engine is set based on the remaining power of the battery. However, if a load of a cooling operation is small, it may be better to make the timing for activating the engine late. For example, when a preset temperature is relatively high or when a temperature of outside air is relatively low, the load of the cooling operation is determined as small. In contrast, if the load of the cooling operation is high, it may be better to make the timing for activating the engine early so as to increase the drive distance.

Also in the heating operation, the suitable timing for activating the engine may be different based on not only the remaining power of the battery but also a load of the heating operation.

SUMMARY

It is an object of the present disclosure to provide an air-conditioning control device for an electric vehicle so as to increase a traveling possible distance of the electric vehicle per charging.

According to an example of the present disclosure, an air-conditioning control device for an electric vehicle that travels using electric power of a battery includes a detector, a calculator and a switching portion. The detector detects a remaining power of the battery. The calculator calculates a demand load of air-conditioning based on at least one of a preset temperature set for air in a passenger compartment of the electric vehicle and an outside temperature of air outside of the electric vehicle. The switching portion switches a mode of the air-conditioning between a battery mode and an engine mode based on the calculated demand load and the detected remaining power of the battery. The battery mode causes the battery to supply the electric power for the air-conditioning, and the engine mode causes an engine of the electric vehicle to supply combustion energy for the air-conditioning.

Accordingly, the traveling possible distance of the electric vehicle per charging can be increased.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (Embodiment)

Figure 1:
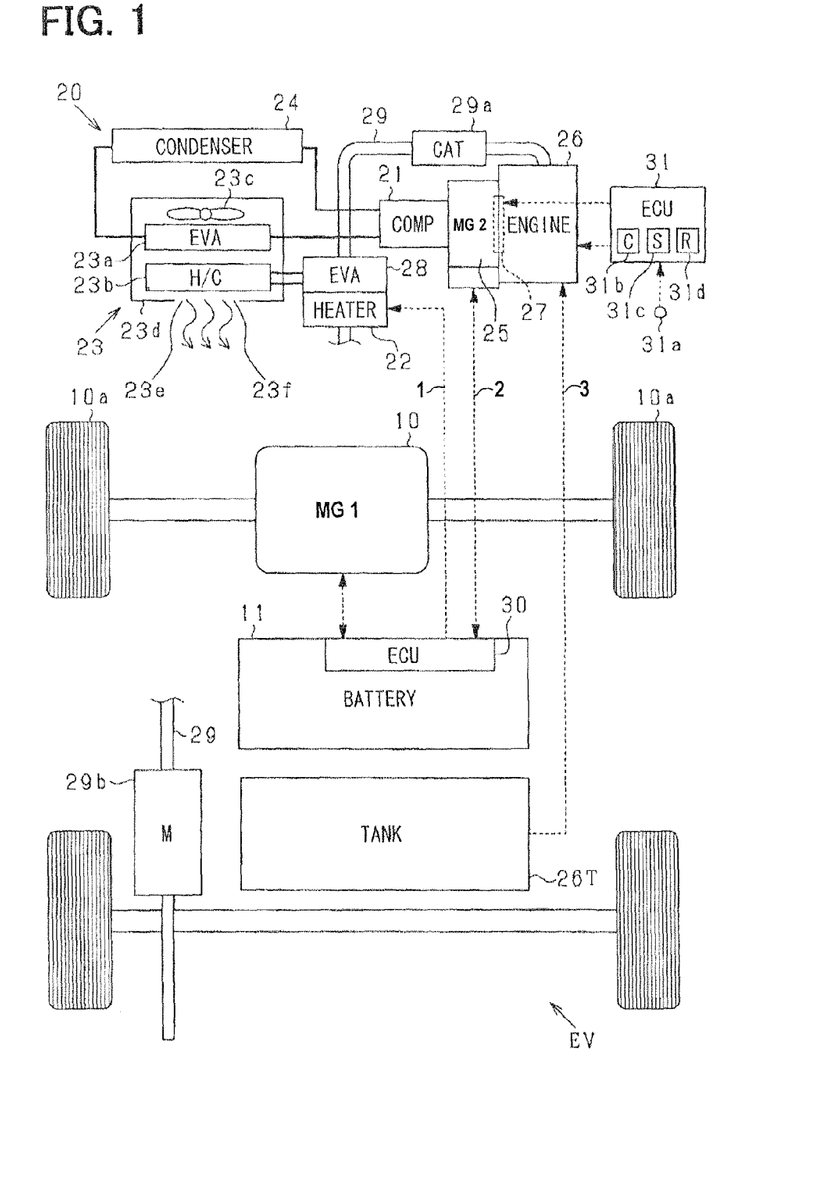
FIG. 1 is a schematic view illustrating an air-conditioning control device according to an embodiment.

As shown in FIG. 1, an electric vehicle (EV) includes a drive motor 10 (MG 1) and a battery 11. The drive motor 10 is supplied with electric power from the battery 11, and drives driving wheels 10a of the electric vehicle. The battery 11 is a plug-in type battery which is charged by commercial utility power such as 100V before the electric vehicle starts traveling. The drive motor 10 also works as a generator. When a speed of the electric vehicle is decelerated, power is regenerated in the drive motor 10 by the decelerating energy, and the battery 11 is charged with the regenerated power.

The electric power of the battery 11 is also supplied to other components of the electric vehicle, such as a compressor 21 or an electric heater 22 (see dashed line 1), other than the drive motor 10. The compressor 21 and the electric heater 22 construct an air-conditioner 20 which conditions inside air of a passenger compartment of the electric vehicle. A structure of the air-conditioner 20 will be described hereinafter.

The air-conditioner 20 has an air-conditioning unit 23 arranged in the passenger compartment. The air-conditioning unit 23 has an air-conditioning case 23d that accommodates an evaporator 23a, a heater core 23b, a blower 23c, and the like. The blower 23c is driven with the electric power supplied from the battery 11.

When the air-conditioner 20 conducts a cooling operation, air sent by the blower 23c exchanges heat with refrigerant such as HFC134a in the evaporator 23a, so that the air is cooled. The cooled air is blown off into the passenger compartment through an outlet 23e of the air-conditioning case 23d.

When the air-conditioner 20 conducts a heating operation, air sent by the blower 23c exchanges heat with heat medium such as water in the heater core 23b, so that the air is heated. The heated air is blown off into the passenger compartment through an outlet 23f of the air-conditioning case 23d.

The refrigerant in the evaporator 23a circulates through a refrigerating cycle in order of the compressor 21, a condenser 24, an expansion valve (not shown), the evaporator 23a, and the compressor 21. High-temperature gas refrigerant flowing out of the compressor 21 exchanges heat with outside air in the condenser 24, so that the refrigerant is condensed. Then, the condensed low-temperature liquid refrigerant is expanded by the expansion valve and exchanges heat with the air sent by the blower 23c in the evaporator 23a, so that the refrigerant is evaporated.

The compressor 21 is driven by an electric motor 25 (MG 2). In ordinary time, the electric motor 25 is driven by the electric power supplied from the battery 11 (see dashed line 2). Moreover, the electric motor 25 can be driven by combustion energy of an engine 26. The electric vehicle includes the relatively small internal combustion engine 26 and a fuel tank 26T which stores fuel for the engine 26 (see dashed line 3).

The electric motor 25 is mechanically connected to an output shaft of the engine 26 through an electromagnetic clutch 27. When the engine 26 is active, the electromagnetic clutch 27 is made active, and the electric motor 25 is driven by the output shaft of the engine 16 through the clutch 27. When the engine 26 is not active, the electromagnetic clutch 27 is turned off, and the connection between the engine 26 and the electric motor 25 is intercepted. At this time, the electric motor 25 is driven with the electric power of the battery 11. In addition, while the electric motor 25 is driven by the engine 26, the electric motor 25 works as a generator, and the battery 11 is charged with the power generated by the electric motor 25.

The variable capacity type compressor is adopted as the compressor 21 in the embodiment. The refrigerant discharge capacity per rotation of the compressor 21 can be variably controlled. If the discharge capacity is controlled to be zero, all the output of the engine 26 can be used for the power generation in the electric motor 25. That is, the output of the engine 26 is controlled to have a usage ratio between a first energy used for the power generation in the electric motor 25 and a second energy used for the cooling operation, by controlling the discharge capacity of the compressor 21. The usage ratio is controlled by a ratio controller 31d of an engine ECU 31 to be described below.

The heat medium in the heater core 23b circulates through a heat cycle including the heater core 23b and an evaporator 28. In the evaporator 28, the heat medium is heated by the electric heater 22, so that the heat medium is evaporated. Then, the heat medium exchanges heat with the air sent by the blower 23c in the heater core 23b, so that the heat medium is condensed. The heat cycle is a thermo siphon type cycle, so that the liquid heat medium condensed by the heater core 23b flows back to the evaporator 28 using gravity.

When the heat medium is heated in the evaporator 28, the heating may be performed by exhaust heat of the engine 26, instead of the electric heater 22. That is, heat exchange may be performed between the heat medium of the evaporator 28 and exhaust gas flowing through an exhaust pipe 29 of the engine 26. For example, in the example of FIG. 1, the evaporator 28 is arranged between a catalyst device 29a and a muffler 29b, in the exhaust pipe 29.

A battery ECU 30 controls a discharge amount and a charge amount of the battery 11. Specifically, the battery ECU 30 controls the amount of the electric power supplied to the drive motor 10 based on a demanded drive load. Further, the battery ECU 30 controls the amount of the electric power supplied to the electric motor 25 based on a demanded cooling load. Furthermore, the battery ECU 30 controls the amount of the electric power supplied to the electric heater 22 based on a demanded heating load. Moreover, the battery ECU 30 controls the charge amount charged by the drive motor 10. Moreover, the battery ECU 30 controls the charge amount charged by the electric motor 25 when the engine is active.

A remaining power amount of the battery 11 has an optimal range. The remaining power amount of the battery 11 is represented by a state of charge (hereinafter referred as SOC) that means a ratio of an actual charge amount to a full charge amount when the battery 11 is fully charged. For example, the optimal range has an upper limit such as 95% and a lower limit such as 10%. If the battery 11 is overcharged by exceeding the upper limit, or if the battery 11 is overdischarged by exceeding the lower limit, deterioration of the battery 11 will be accelerated.

The battery ECU 30 limits the charge from the drive motor 10 or the electric motor 25 so that the battery ECU 30 restricts the battery 11 from being overcharged. Moreover, when the state of charge SOC is lowered to the lower limit while the electric vehicle is traveling, the battery ECU 30 limits the discharge so that the battery ECU 30 restricts the battery 11 from being overdischarged. At this time, for example, the engine 26 is started to restrict the overdischarge.

The engine ECU 31 controls the operation of the engine 26. Specifically, the engine ECU 31 controls an injection quantity and timing of fuel injected from a fuel injection valve of the engine 26, an air intake amount, and an ignition timing, for example, based on a rotation speed of the output shaft of the engine 26 and the demanded drive load.

The engine ECU 31 further controls the operation of the air-conditioner 20. Specifically, the engine ECU 31 controls the connection state of the electromagnetic clutch 27, the discharge capacity of the compressor 21, and the operation of the blower 23c based on the demanded cooling load and the demanded heating load.

The demanded cooling load and the demanded heating load may correspond to a demand load of air-conditioning. A calculator 31b of the engine ECU 31 calculates the demand load of air-conditioning based on an outside air temperature detected by an outside air temperature sensor 31a and a preset temperature of the passenger compartment set by an occupant of the vehicle. The operation of the air-conditioner 20 may be performed by the battery ECU 30, instead of the engine ECU 31. Further, an exclusive ECU may be additionally provided to control the operation of the air-conditioner 20.

The battery ECU 30 and the engine ECU 31 are constructed to be able to mutually communicate with each other. At least one of the battery ECU 30, the engine ECU 31 and the exclusive ECU conducts a switching control in an air-conditioning mode to be explained below. For example, a switching portion 31c of the engine ECU 31 conducts the switching control.

Figure 2:
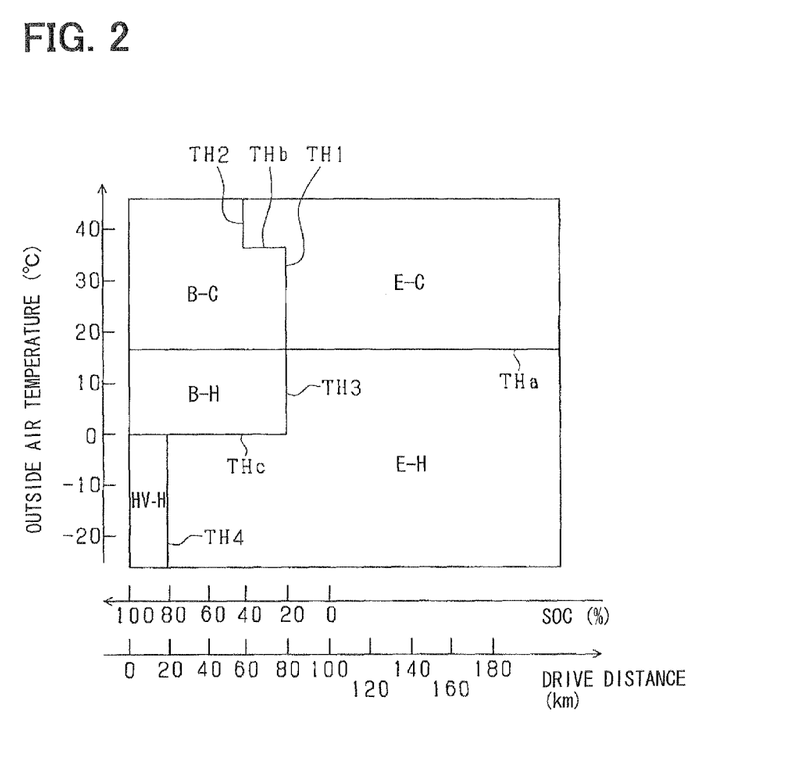
FIG. 2 is a map illustrating a battery cooling mode, an engine cooling mode, a battery heating mode, an engine heating mode, and a hybrid heating mode switched by the air-conditioning control device.

A map of the air-conditioning mode is shown in FIG. 2. The air-conditioning mode has a battery cooling (B-C) mode and an engine cooling (E-C) mode. The passenger compartment is cooled by the air-conditioner 20 in each of the cooling modes. The air-conditioning mode further has a battery heating (B-H) mode, an engine heating (E-H) mode, and a hybrid heating (HV-H) mode (hybrid air-conditioning mode). The passenger compartment is heated by the air-conditioner 20 in each of the heating modes.

The engine cooling mode and the engine heating mode correspond to an engine air-conditioning mode by which the air-conditioning is performed by the engine output. The battery cooling mode and the battery heating mode correspond to a battery air-conditioning mode by which the air-conditioning is performed by the battery output. The air-conditioning mode is controlled to be switched in accordance with the demand load of air-conditioning and the remaining power amount SOC of the battery 11.

In the example of FIG. 2, the outside air temperature is used as the demand load of air-conditioning. That is, the demanded cooling load becomes high as the outside air temperature becomes high in the cooling operation, and the demanded heating load becomes high as the outside air temperature becomes low in the heating operation.

Alternatively, the demand load of air-conditioning may be calculated based on both of the outside air temperature and the preset temperature. The demanded cooling load becomes low as the preset temperature is set higher in the cooling operation, and the demanded heating load becomes low as the preset temperature is set lower in the heating operation.

The battery ECU 30 corresponds to a detector that detects the remaining power of the battery 11. Specifically, the detector detects a terminal voltage of the battery 11 as a battery voltage. The battery 11 has a reference voltage when charging and discharging are not conducted. The detector estimates the remaining power SOC of the battery 11 based on the detected voltage and the reference voltage.

Alternatively, the detector may detect an electric current flowing through the battery 11 as a battery current, and may estimate the remaining power SOC of the battery 11 based on the integrated value of the battery current. Further, the remaining power SOC of the battery 11 may be estimated based on both of the battery voltage and the integrated value of the battery current.

Figure 3A:
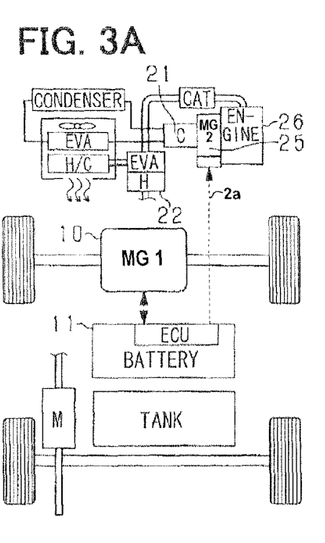
FIG. 3A is a view illustrating an operation of the battery cooling mode.

As shown in FIG. 3A, if the battery cooling mode is set, the electric vehicle travels using the electric power of the battery 11 in a state that the engine 26 is not active, and the cooling operation is performed by the air-conditioner 20. At this mode, electric power is supplied from the battery 11 to the electric motor 25 (see dashed line 2a) so as to drive the compressor 21. That is, the compressor 21 is driven by the electric power of the battery 11 so as to perform the cooling operation.

Figure 3B:
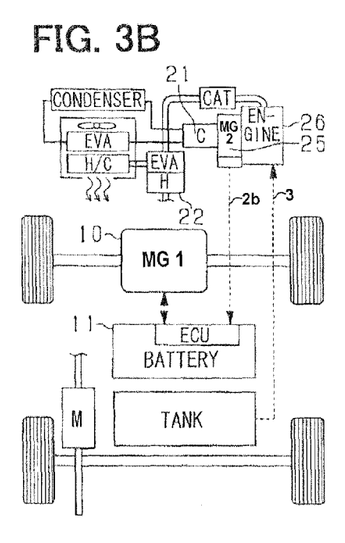
FIG. 3B is a view illustrating an operation of the engine cooling mode.

As shown in FIG. 3B, if the engine cooling mode is set, the cooling operation is performed by the air-conditioner 20. At this time, the electric vehicle drives with the electric power of the battery 11 and the electric motor 25 generates electricity (see dashed line 2b) using the combustion energy of the engine 26. In this mode, the electric motor 25 is driven by the rotation torque (engine output) of the output shaft of the engine 26, and the compressor 21 is driven by the electric motor 25. That is, the compressor 21 is driven by the combustion energy of the engine 26 so as to perform the cooling operation.

Figure 3C:
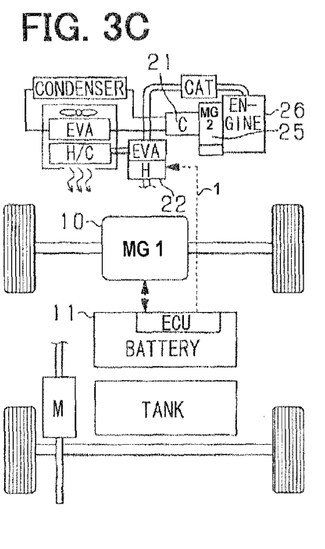
FIG. 3C is a view illustrating an operation of the battery heating mode.

As shown in FIG. 3C, if the battery heating mode is set, the electric vehicle drives with the electric power of the battery 11 in a state that the engine 26 is not active, and the heating operation is performed by the air-conditioner 20. At this mode, electric power is supplied from the battery 11 to the electric heater 22, and the heat medium of the heater core 23b is heated, so that the air sent by the air-conditioner 20 is heated. That is, the heating operation is performed using the electric power of the battery 11.

Figure 3D:
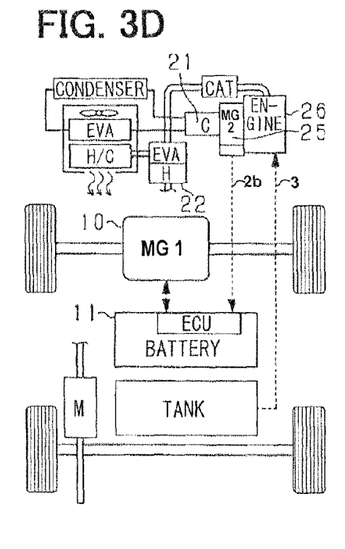
FIG. 3D is a view illustrating an operation of the engine heating mode.

As shown in FIG. 3D, if the engine heating mode is set, the heating operation is performed by the air-conditioner 20. At this time, the electric vehicle drives with the electric power of the battery 11 and the electric motor 25 generates electricity using the combustion energy of the engine 26. In this mode, the heat medium of the heater core 23b is heated by the exhaust heat of the engine 26, so that the air sent by the air-conditioner 20 is heated. That is, the heating operation is performed using the combustion energy of the engine 26.

In the hybrid heating mode, the heating operation is performed by the air-conditioner 20. At this time, the electric vehicle drives with the electric power of the battery 11 and the electric motor 25 generates electricity using the combustion energy of the engine 26. In this mode, the heat medium of the heater core 23b is heated by both of the exhaust heat of the engine 26 and the electric heater 22. That is, the heating operation is performed using both of the combustion energy of the engine 26 and the electric power of the battery 11.

Because the engine 26 is stopped in the battery cooling mode and the battery heating mode, the electromagnetic clutch 27 disconnects the electric motor 25 and the engine 26 from each other. Because the engine is active in the engine cooling mode, the engine heating mode and the hybrid heating mode, the electromagnetic clutch 27 connects the electric motor 25 and the engine 26 with each other. If the cooling operation is not performed even when the engine 26 is active, the discharge capacity of the compressor 21 is set as zero.

Next, the switching operation in the air-conditioning mode is explained with reference to FIG. 2. The axis of ordinate of FIG. 2 represents the outside air temperature. The axis of ordinate may be the demand load of air-conditioning or other physical quantity relating with the demand load of air-conditioning, such as the preset temperature. A calculator that calculates the demand load of air-conditioning is constructed by the calculator 31b of the ECU 31, and the calculation is performed based on a detection value of the outside air temperature sensor 31a, for example.

The axis of abscissa of FIG. 2 represents the remaining power SOC of the battery 11. If the battery 11 is fully charged with the commercial utility power before the electric vehicle starts driving, the remaining power SOC is 100% or higher than 95% that is the upper limit of the optimal range at the drive start timing. Then, the remaining power SOC is gradually reduced as the electric vehicle continues traveling to increase the drive distance. That is, the axis of abscissa of FIG. 2 may be the drive distance or travel continuation time.

The switching control in the air-conditioning mode will be described. First, it is determined to perform the heating operation or the cooling operation based on the outside air temperature. For example, if the outside air temperature is equal to or higher than a predetermined temperature THa such as 17° C., the cooling mode is set. In contrast, if the outside air temperature is lower than the predetermined temperature THa, the heating mode is set.

Then, it is determined whether the engine 26 is to be activated or not based on the remaining power SOC of the battery 11 at that timing. That is, if the remaining power SOC is equal to or higher than a threshold value TH1, TH2, TH3, TH4 (hereinafter referred as TH1-TH4), the battery cooling mode is selected in the cooling operation, or the battery heating mode is selected in the heating operation. Because the remaining power SOC is enough, the engine 26 is not activated.

If the remaining power SOC is lower than the threshold value TH1-TH4, the engine cooling mode is selected in the cooling operation, or the engine heating mode is selected in the heating operation. Because the remaining power SOC is not enough, the engine 26 is activated. The threshold value TH1-TH4 is variably set based on the outside air temperature corresponding to the demand load of air-conditioning.

For example, while the cooling operation is performed, if the outside air temperature is equal to or more than a predetermined temperature THb such as 35° C., the threshold value set for selecting the battery cooling mode or the engine cooling mode is set as TH2 (SOC=40%) by the ECU 30, 31.

In contrast, while the cooling operation is performed, if the outside air temperature is lower than the predetermined temperature THb, the threshold value set for selecting the battery cooling mode or the engine cooling mode is set as TH1 (SOC=20%) by the ECU 30, 31.

There is a relationship of TH2>TH1. The switching portion 31c of the ECU 31 corresponds to a switching portion that switches the air-conditioning mode.

Moreover, while the heating operation is performed, if the outside air temperature is equal to or more than a predetermined temperature THc such as 0° C., the threshold value set for selecting the battery heating mode and the engine heating mode is set as TH3 (SOC=20%) by the ECU 30, 31.

In contrast, while the heating operation is performed, if the outside air temperature is lower than the predetermined temperature THc, the threshold value set for selecting the hybrid heating mode and the engine heating mode is set as TH4 (SOC=80%) by the ECU 30, 31.

There is a relationship of TH4>TH3. The switching portion 31c of the ECU 31 corresponds to a switching portion that switches the air-conditioning mode.

According to the embodiment, as the demand load of air-conditioning is larger, the engine 26 is started earlier even in a state where a large amount of the remaining power SOC is left in the battery 11 and the air-conditioning is performed using the engine output prior to the battery output.

When the outside air temperature is lower than the predetermined temperature THc and when the remaining power SOC is equal to or higher than the threshold value TH4, the hybrid heating mode is selected as the air-conditioning mode.

The electric vehicle usually starts driving with the battery cooling mode or the battery heating mode in which the engine 26 is stopped, because the remaining power SOC of the battery 11 is enough high at the drive start timing.

As the remaining power SOC of the battery 11 is lowered when the electric vehicle drives long distance, the air-conditioning mode is switched to the engine cooling mode or the engine heating mode.

However, according to the embodiment, the engine 26 is started at the early stage in the long drive so as to keep the remaining power SOC of the battery 11 as higher level, when the outside air temperature is relatively high (higher than THb), or when the outside air temperature is relatively low (lower than THc).

Alternatively, the engine 26 is started at the early stage in the long drive so as to keep the remaining power SOC of the battery 11 as higher level, when the preset temperature is relatively low (when the cooling load is large in the cooling operation), or when the preset temperature is relatively high (when the heating load is large in the heating operation).

According to the embodiment, the air-conditioning mode is changed based on not only the remaining power SOC of the battery 11 but also the demand load of air-conditioning. Therefore, the air-conditioning mode is switched to the engine heating mode or the engine cooling mode at suitable timing, and the engine 26 is started in a manner that the drive possible distance can be increased in the state where the electric power of the battery 11 is used prior to fuel for the engine 26.

Moreover, if the outside air temperature is very low such as lower than 0° C., and if the battery 11 has sufficient remaining power SOC such as higher than 80%, the heat medium can be heated by both of the electric heater 22 and the exhaust heat of the engine 26. Therefore, the passenger compartment can be quickly heated to have a target temperature even when the outside air temperature is very low.

The present disclosure is not limited to the above embodiment.

The threshold value TH1-TH4 may be variably set in accordance with a distance left to a destination of the electric vehicle. In this case, the engine 26 can be started at the optimal timing so that drive possible distance can be increased to be the maximum.

The distance left to the destination is calculated based on the current position information and the destination information which are provided from a navigation device of the electric vehicle. Alternatively, a driver of the vehicle may input a drive plan distance along which the electric vehicle drives without activating the engine 26 before starting traveling, and the distance left to the destination may be estimated based on the input drive plan distance and a drive distance the electric vehicle already has driven.

The threshold value TH1-TH4 may be variably set in a manner that the remaining power SOC of the battery 11 has a target value when the electric vehicle arrives at the destination. The target value may correspond to the lower limit of the optimal range of the remaining power SOC. In this case, the air-conditioning mode can be switched to promote the use of the electric power of the battery 11 rather than the use of fuel for the engine 26.

In the engine heating mode and the hybrid heating mode where the engine 26 is activated, the ratio controller 31d of the engine ECU 31 may control a usage ratio of the combustion energy of the engine 26 between energy used for driving the electric motor 25 and energy used for heating the heat medium of the evaporator 28 based on the demanded heating load, the remaining power of the battery 11, and the drive load of the electric vehicle. In this case, the drive possible distance can be increased by efficiently using the combustion energy of the engine 26.

The ratio controller 31d of the engine ECU 31 may correspond to a ratio controller that controls a usage ratio of the combustion energy between a first energy used for the air-conditioning and a second energy used for driving the generator based on at least one of the calculated demand load, the remaining power of the battery and the drive load.

For example, the temperature of the exhaust heat is raised by retarding the ignition timing of the engine 26. In this case, a heating output ratio that represents a ratio of the energy used for the heating operation to the energy used for the power generation can be raised. Therefore, the heating output ratio can be controlled by controlling the ignition timing based on the demanded heating load, the remaining power of the battery, and the drive load.

In the engine cooling mode, the engine ECU 31 may control the usage ratio of the combustion energy of the engine 26 between the energy used for driving the compressor 21 and the energy used for driving the electric motor 25, based on the demanded cooling load, the remaining power of the battery 11, and the drive load. A cooling output ratio that represents a ratio of the energy used for the cooling operation to the energy used for the power generation can be controlled by the engine ECU 31. In this case, the drive possible distance can be increased by efficiently using the combustion energy of the engine 26.

The engine ECU 31 has the ratio controller 31d that controls a usage ratio of the combustion energy between a first energy used for the air-conditioning and a second energy used for driving the generator based on at least one of the calculated demand load, the remaining power of the battery and the drive load.

For example, the cooling output ratio can be raised by increasing the discharge capacity of the compressor 21, because the cooling ability of the evaporator 23a is raised. Therefore, the cooling output ratio can be controlled by controlling the discharge capacity of the compressor 21 based on the demanded cooling load, the remaining power of the battery, and the drive load.

When the heating output ratio or the cooling output ratio is controlled, the controlling may be performed in a manner that the remaining power SOC of the battery 11 has a target value when the electric vehicle arrives at the destination. Alternatively, the controlling may be performed in a manner that the fuel consumption amount of the engine 26 becomes the minimum at the timing when the electric vehicle arrives at the destination.

The output of the battery 11 is decreased in accordance with a decrease in the remaining power SOC. Furthermore, the output of the battery 11 is decreased as the temperature of the battery 11 is lowered, even if the remaining power SOC is the same. That is, the battery output may be lowered as the outside air temperature becomes lower. Therefore, the threshold value TH1-TH4 used for the mode change may be variably set based on the outside air temperature. That is, the threshold value TH1-TH4 is set higher as the outside air temperature is lower, so that the engine 26 is started much earlier in this case.

The compressor 21 of the air-conditioner 20 is driven by the rotation torque of the output shaft of the engine 26 or the electric power of the battery 11. That is, the compressor 21 is driven by the output torque of the engine 26 in the engine cooling mode, and is driven with the electric power of the battery 11 in the battery cooling mode.

Alternatively, an electrically-driven compressor may be adopted as the compressor 21, and is driven only with the electric power of the battery 11. In this case, when the engine cooling mode is selected, electric power generated by the engine output is used as a power source.

The heat medium of the heater core 23b is configured to circulate through the heater core 23b and the evaporator 28. Alternatively, the heat medium may be an engine cooling water which circulates through the engine and a radiator.

Such changes and modifications are to be understood as being within the scope of the present disclosure as defined by the appended claims.

What is claimed is:

1. An air-conditioning control device for an electric vehicle that travels using electric power of a battery, the air-conditioning control device comprising:
    a detector configured to detect a remaining power of the battery;
    a calculator configured to calculate a demand load of air-conditioning based on at least one of a preset temperature set for air in a passenger compartment of the electric vehicle and an outside temperature of air outside of the electric vehicle; and
    a switching portion configured to switch a mode of the air-conditioning between a battery mode and an engine mode based on the calculated demand load and the detected remaining power of the battery, the battery mode causing the battery to supply the electric power for the air-conditioning, the engine mode causing an engine of the electric vehicle to supply combustion energy for the air-conditioning, wherein
    the switching portion is configured to switch the mode of the air-conditioning to the batter mode when the detected remaining power is larger than or equal to a first predetermined value in case where the calculated demand load is lower than a threshold,
    the switching portion is configured to switch the mode of the air-conditioning to the engine mode when the detected remaining power is smaller than the first predetermined value in case where the calculated demand load is lower than the threshold,
    the switching portion is configured to switch the mode of the air-conditioning to the battery mode when the detected remaining power is larger than or equal to a second predetermined value which is larger than the first predetermined value in case where the calculated demand load is higher than or equal to the threshold, and
    the switching portion is configured to switch the mode of the air-conditioning to the engine mode when the detected remaining power is smaller than the second predetermined value in case where the calculated demand load is higher than or equal to the threshold.

2. The air-conditioning control device according to claim 1, wherein
    the mode of the air-conditioning further has a hybrid mode, the air-conditioning being conducted using both of the engine and the battery in the hybrid mode,
    the switching portion is configured to switch the mode of the air-conditioning among the battery mode, the engine mode and the hybrid mode based on the calculated demand load and the remaining power of the battery, and
    the hybrid mode causes the battery to be charged by the combustion energy of the engine, and causes the passenger compartment to be air-conditioned using the electric power of the battery and exhaust heat of the engine generated by the combustion energy.

3. The air-conditioning control device according to claim 1, wherein
    the switching portion is configured to switch the mode of the air-conditioning based on the calculated demand load, the remaining power of the battery, and a driving distance remaining before a destination.

4. The air-conditioning control device according to claim 1, wherein
    the switching portion is configured to switch the mode of the air-conditioning in a manner that the remaining power of the battery has a target value when the electric vehicle reaches a destination.

5. The air-conditioning control device according to claim 1, further comprising:
    a generator through which the combustion energy of the engine is chargeable for the battery in addition to being used for the air-conditioning in the engine mode; and
    a ratio controller configured to control a usage ratio of the combustion energy between a first energy used for the air-conditioning and a second energy used for driving the generator based on at least one of the calculated demand load, the remaining power of the battery and a drive load of the electric vehicle.

6. The air-conditioning control device according to claim 5, wherein
    the ratio controller is configured to control the usage ratio of the combustion energy in a manner that the remaining power of the battery has a target value when the electric vehicle reaches a destination.

7. The air-conditioning control device according to claim 5, wherein
    the ratio controller is configured to control the usage ratio of the combustion energy in a manner that an amount of fuel consumed by the engine becomes the minimum when the electric vehicle reaches a destination.

8. The air-conditioning control device according to claim 1, wherein:
the calculator is configured to:
calculate the demand load of air-conditioning based on at least the outside temperature of air outside of the electric vehicle; and
variably set a threshold value based on at least the outside temperature of air corresponding to the demand load of air-conditioning; and
the switching portion is configured to select the mode based on the set threshold.

9. The air-conditioning control device according to claim 8, wherein:
the switching portion is configured to select a battery cooling mode or a battery heating mode when the remaining power is higher than the threshold.

10. The air-conditioning control device according to claim 8, wherein:
the switching portion is configured to select an engine cooling mode or an engine heating mode when the remaining power is lower than the threshold.

11. The air-conditioning control device according to claim 2, wherein
the switching portion is configured to switch the mode of the air-conditioning to the hybrid mode when the detected remaining power is larger than or equal to the second predetermined value in a low temperature environment where a temperature of air outside the electric vehicle is lower than a predetermined temperature.

12. The air-conditioning control device according to claim 2, wherein
the hybrid mode causes the battery to be charged by the combustion energy, and causes the passenger compartment to be heated using the electric power of the battery and exhaust heat of the engine generated by the combustion energy in a low temperature situation.

* * * * *